A. AHLDEN.
SAW SET.
APPLICATION FILED APR. 1, 1912.
1,037,711.
Patented Sept. 3, 1912.
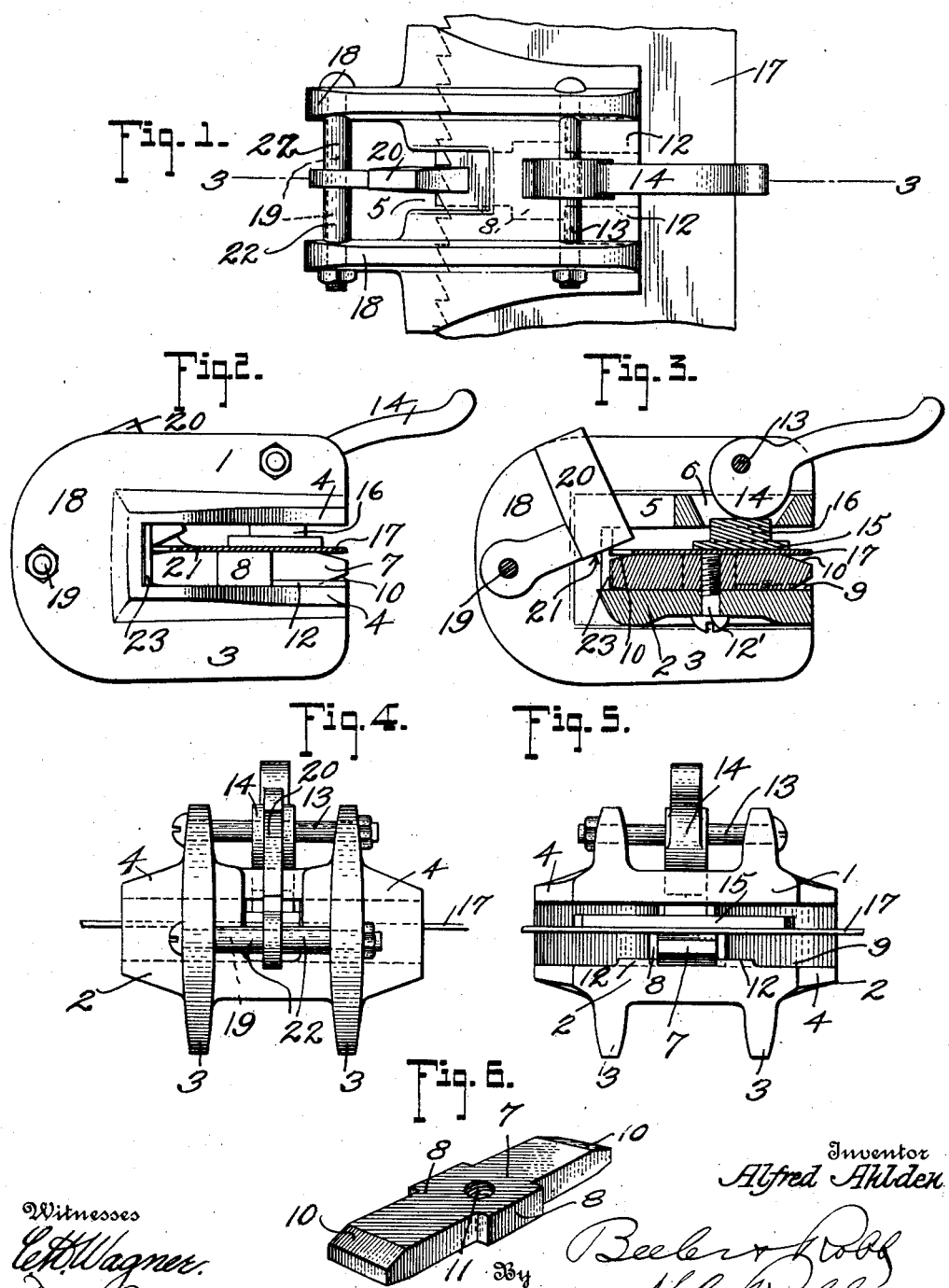
Witnesses
E.H. Wagner
D.E. Burdine
Inventor
Alfred Ahlden
By Beeler & Robb
H.E. Robb
Attorneys

UNITED STATES PATENT OFFICE.

ALFRED AHLDEN, OF NORTHPORT, WASHINGTON.

SAW-SET.

1,037,711.  Specification of Letters Patent.  Patented Sept. 3, 1912.

Application filed April 1, 1912. Serial No. 687,666.

*To all whom it may concern:*

Be it known that I, ALFRED AHLDEN, a subject of the King of Sweden, residing at Northport, in the county of Stevens and State of Washington, have invented certain new and useful Improvements in Saw-Sets, of which the following is a specification.

The present invention relates to saw sets, and has for its object to provide a device of this class which is adapted to set the teeth of saws so as to provide for almost any desired angular inclination of the set of the teeth.

A further object of the invention is to so construct a saw set that the main body of the device may be cast or otherwise formed in one piece, and to further provide an improved swaging means for operating on the teeth.

For a full understanding of the present invention, reference is to be had to the following description and to the accompanying drawings, in which—

Figure 1 is a top plan view of the improved saw set. Fig. 2 is a side elevation of the device. Fig. 3 is a central section taken on the line 3—3 of Fig. 1. Fig. 4 is a front end elevation. Fig. 5 is a rear elevation. Fig. 6 is a perspective view of the particular form of anvil used in the device.

Throughout the following detail description and on the several figures of the drawings, similar parts are referred to by like reference characters.

Referring particularly to the drawings, 1 and 2 indicate two jaws which, in practice, will preferably be cast in one integral piece, and made of cast iron. The jaw 2 has depending flanges 3 by which the saw set may be clamped to an ordinary bench vise. The jaws 1 and 2 are formed with flaring extensions 4, in order to afford wider housing space for some of the interior operative parts of the device. The upper jaw 1 is cut away for a suitable distance from its interior front edge, as at 5, in order to afford space for the operation of the swaging hammer, hereinafter described, when it acts upon the saw teeth. The rear portion of the upper surface of the jaw 1 is provided with an opening 6, in order to afford a space for the operation of the cam lever also hereinafter described.

An anvil 7, provided with two shoulders 8, one on each side thereof, is seated during the operation of the saw set on the interior face 9 of the lower jaw 2, and the particular structure of the anvil may be seen from Figs. 2, 3 and 6. The anvil is preferably formed of tempered tool steel and possesses a substantially rectangular shape, like that shown in Fig. 6. It is beveled at each of its four end edges, as at 10, in order to provide different angular inclinations for the set of the saw teeth. The anvil is provided with a screw threaded opening 11 at about its central portion, through which passes a screw or bolt 12', the head of which will be outside the under side of the jaw, providing a ready means whereby the anvil may be removed from its seat on the jaw 2, and any one of its inclined edges presented so as to be in an operative position for setting the saw teeth.

The inner face of the lower jaw 2 is provided with two raised portions or shoulders 12, each extending from the rear end of the jaw inwardly for a short distance, the function of the shoulders being to engage the shoulders 8 formed in the sides of the anvil 7, so as to limit the rearward movement of the anvil and maintain the front operative edge of the anvil in the desired position, that is, that shown in Figs. 2 and 3.

A shaft 13 has suitable bearings in the upwardly extending flanges of the upper jaw 1, said shaft serving as a bearing for a cam lever 14 of the shape particularly shown in Fig. 3. The lower portion of the cam lever works in the space 6 of the jaw 1 hereinbefore referred to. In a position immediately below said cam lever and extending transversely of the jaws, is arranged a freely moving bearing plate 15 having an upwardly extending shoulder 16, which latter is adapted to play in the space 6 so as to be engaged by the cam lever 14. The function of the bearing plate 15 will be obvious.

The saw 17, shown in cross section in Figs. 2 and 3, will be inserted between the two jaws 1 and 2, so that one side of the saw will lie on top of the anvil 7 with its teeth above the beveled edge of the same which is then in operative position, it being possible to insert the saw in this position by virtue of free play allowed the bearing plate 15 when the handle of the cam lever is in a vertical position. In order to secure the saw so as to set the same, the handle of the cam lever will be moved downwardly and its lower portion will bear downwardly upon the bearing plate 15.

The jaws 1 and 2 are provided with front flanged extensions 18, of the shape particularly shown in Figs. 1 and 2. These extensions, at about their central point afford a bearing for a shaft 19, on which is mounted, at approximately a central point thereof, a swaging hammer 20 of the shape shown in Figs. 1 and 3. This swaging hammer consists of an arm pivoted to the shaft 19 carrying at its outer extremity the swaging portion which is of the elongated shape shown in Fig. 3, the entire swaging hammer being adapted to be formed in one piece and is preferably made of steel. Its lower edge 21 is so positioned as to come in contact with the selected saw tooth, which latter will be in a position over the upper inclined front edge of the anvil 7, and a blow exerted on the swaging hammer 20 will obviously set the saw tooth to the desired inclination. The swaging hammer may be held in its desired position upon the shaft 19 by means of collars 22 arranged upon said shaft 19, one at each side of the hammer. If it is desired to permit free lateral movement of the swaging hammer on the shaft 19 in order to bring the same into position so as to act upon alternate teeth, as far as it would be possible to do so within the space 5, the provision of the collars 22 will not be necessary.

A strip of metal, softer than tempered steel and preferably copper, is inserted at 23 in the space between the jaws 1 and 2, one strip being placed on each side of the anvil 7. The function of said strips is to prevent the saw teeth from engaging the iron or steel sides of the portions to which the strips are applied, whereby the teeth would obviously be bent at their points. The strips being softer, would not injure the teeth and they may be bent around at their edges so as to engage the outer edges of the side extensions 4 and the inner edges of the jaws at the space 5.

From the foregoing description, taken in connection with the drawings, it will be seen that I have provided an improved saw-set, all of the parts of which are of extremely simple construction and will not break under strain or get out of order. The construction and relative arrangement of the parts permits of the easy removal of the anvil and its adjustment to a new position, this latter feature affording an improved means whereby almost any degree of set may be given the saw teeth. The swaging hammer properly centered over each saw tooth to be set affords, by the blow of a hammer, or the like on its upper part, a means for accurately setting each tooth without the liability of striking at the same blow an adjacent tooth and setting it in the wrong direction.

Having thus described the invention, what is claimed as new is:

1. In a saw set, a main frame comprising a pair of jaws, an anvil mounted in the lower jaw, means for maintaining the anvil in position on said jaw, the upper jaw being provided with an opening above said anvil, a bearing plate disposed above the anvil and freely movable in said opening, a cam lever pivotally mounted in the upper jaw and adapted to engage said bearing plate in said opening to force the plate downwardly toward said anvil, and a swaging hammer pivotally mounted on said frame in such a position as to engage the teeth of a saw when in the proper position.

2. In a saw set, a main frame comprising a pair of jaws, an anvil mounted on the lower jaw and provided with means whereby different degrees of angular inclination may be imparted to a saw lying thereagainst, means for maintaining the anvil in position on said jaw, the upper jaw being provided with an opening above said anvil, a loosely arranged bearing plate disposed above the anvil and freely movable in said opening, means to force the bearing plate downwardly toward said anvil and to clamp a saw in position against said anvil, and a swaging hammer pivotally mounted on said frame in such a position as to engage the teeth of the saw when in the proper position.

In testimony whereof I affix my signature in presence of two witnesses.

ALFRED AHLDEN.

Witnesses:
L. W. SAX,
WM. C. SPEDDEN.

---

Copies of this patent may be obtained for five cents each, by addressing the "Commissioner of Patents, Washington, D. C."